UNITED STATES PATENT OFFICE.

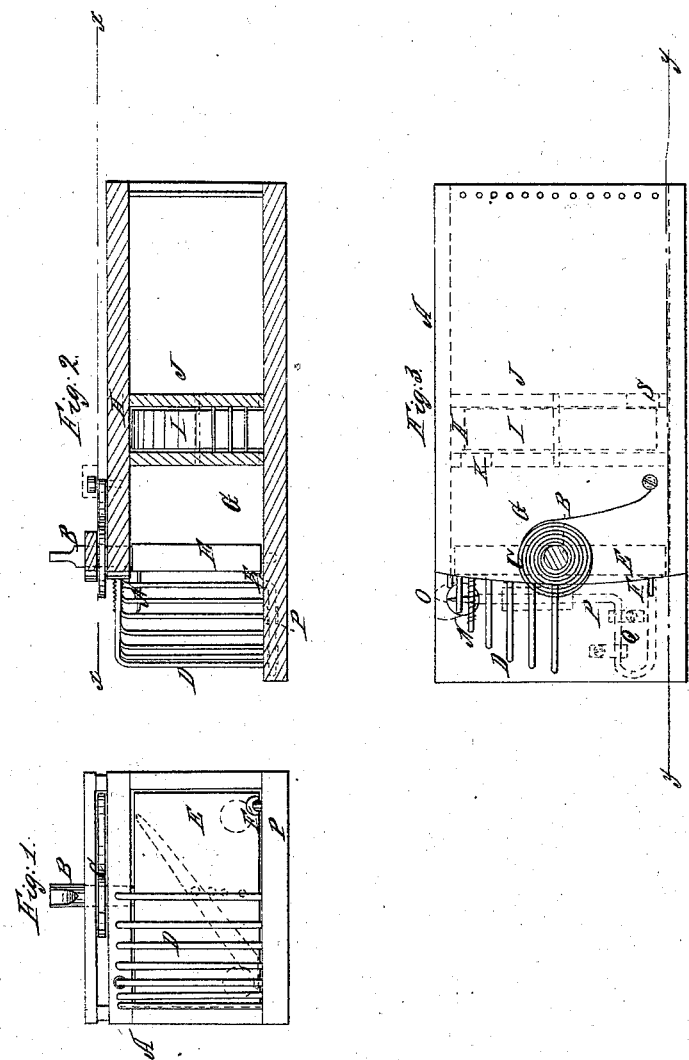

A. A. FRADENBURG, OF NEVADA CITY, CALIFORNIA.

IMPROVEMENT IN ANIMAL-TRAPS.

Specification forming part of Letters Patent No. 54,885, dated May 22, 1866.

*To all whom it may concern:*

Be it known that I, A. A. FRADENBURG, of Nevada City, in the county of Nevada and State of California, have invented a new and useful Improvement in Traps; and I do hereby declare that the following is a full, clear, and exact description thereof, which will enable others skilled in the art to make and use the same, reference being had to the accompanying drawings, forming part of this specification, in which—

Figure 1 is an end view of a trap made after my invention, looking toward its entrance. Fig. 2 is a longitudinal section taken in the line $y$ of Fig. 3. Fig. 3 is a plan, the bar which confines the spring of the door being removed, as indicated by the line $x$ of Fig. 2.

Similar letters of reference indicate like parts.

The object of this invention is to provide a self-setting trap for vermin, which has provision also for forwarding the animals entrapped through an inner apartment into a common receptacle in the rear of the trap, whence they may be removed through a door.

A designates the trap. It is in shape an oblong box, flat on the top, with a platform in front of its entrance.

E is the door of entrance. It reaches across the left-hand end of the box, and is pivoted at its center on a vertical post, B, to which is fixed one end of a spring, C, whose other end is fastened to the top of the trap.

To the under side of the trap is pivoted a bent lever, Q, one of whose ends, F, projects upward through the platform in front of one side of the door E, while the other end lies across the lower edge of a hole, O, cut in the platform in front of the other side of the door. The end of the lever that lies across the opening O is so shaped as to receive the bait, and the lever is so balanced as that the part F will always be above the surface of the platform, and so prevent the door from opening in that direction until sufficient force is used to raise that end of the lever which carries the bait, when the part F will be drawn down and the force of the spring C will revolve the door, which, however, will be arrested after making one-half a revolution if the lever has resumed its first position.

The platform P has a grating, D, at that side which contains the bait, so that the animal cannot escape when the rotation of the door takes place, and shall be compelled to fly into the dark apartment G. The animal cannot push the door open again, because the one side is hindered from being opened by the stop F, and the other side is hindered by the swinging arm N, whose end is pivoted directly toward the last-mentioned side of the door. This arm is suspended from one of the wires of the cage D, and is pushed aside by the door when it swings around in obedience to the spring. When the spring has run down it is wound up again by pushing the arm N to one side and rotating the post or axis B, whose top is shaped so as to be readily turned by the thumb and finger. The animal, after being caught in the apartment G, will run through the opening H (see Fig. 3) into the light apartment H, in which is placed a tilting platform balanced so as to be prone before the opening H; but when the animal ascends this platform his weight tilts it and he falls with it toward the opening S, through which he escapes into the grated apartment M. From this apartment there is no escape, because the tilting platform I has resumed its first position directly it was relieved of the weight of the animal.

I claim as new and desire to secure by Letters Patent—

In traps for vermin, the combination of the grating D on the platform P with the revolving door E, the stop N, and F, substantially as shown.

A. A. FRADENBURG.

Witnesses:
M. M. LITTON,
J. COLLEY.